(12) United States Patent
Ramirez Robredo et al.

(10) Patent No.: US 8,515,731 B1
(45) Date of Patent: Aug. 20, 2013

(54) SYNONYM VERIFICATION

(75) Inventors: Jose Antonio Ramirez Robredo, San Francisco, CA (US); Dimitra Papachristou, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 755 days.

(21) Appl. No.: 12/568,435

(22) Filed: Sep. 28, 2009

(51) Int. Cl.
*G06F 17/28* (2006.01)

(52) U.S. Cl.
USPC .......................................................... 704/2

(58) Field of Classification Search
USPC ........................................................ 704/2, 3
See application file for complete search history.

(56) References Cited

U.S. PATENT DOCUMENTS

| | | | | |
|---|---|---|---|---|
| 6,161,082 A * | 12/2000 | Goldberg et al. | ................. | 704/3 |
| 7,392,244 B1 * | 6/2008 | Dean et al. | ............................. | 1/1 |
| 2004/0064447 A1 * | 4/2004 | Simske et al. | ..................... | 707/5 |
| 2005/0086214 A1 * | 4/2005 | Seewald et al. | .................... | 707/3 |
| 2005/0125215 A1 * | 6/2005 | Wu et al. | ........................... | 704/1 |
| 2007/0011154 A1 * | 1/2007 | Musgrove et al. | ................ | 707/5 |
| 2007/0118512 A1 * | 5/2007 | Riley et al. | ........................ | 707/3 |
| 2007/0203929 A1 * | 8/2007 | Bolivar | ......................... | 707/101 |
| 2007/0288230 A1 | 12/2007 | Datta | | |
| 2007/0288448 A1 | 12/2007 | Datta | | |
| 2007/0288449 A1 | 12/2007 | Datta et al. | | |
| 2007/0288450 A1 * | 12/2007 | Datta et al. | ........................ | 707/5 |
| 2008/0221868 A1 * | 9/2008 | Melnick et al. | ..................... | 704/8 |
| 2009/0292700 A1 * | 11/2009 | Castellani et al. | ................ | 707/6 |
| 2010/0082657 A1 * | 4/2010 | Paparizos et al. | ............. | 707/767 |
| 2010/0169361 A1 * | 7/2010 | Chen et al. | ..................... | 707/769 |
| 2010/0293180 A1 * | 11/2010 | Vanderwende et al. | ...... | 707/759 |

\* cited by examiner

*Primary Examiner* — Jakieda Jackson
(74) *Attorney, Agent, or Firm* — Remarck Law Group PLC

(57) ABSTRACT

Methods, systems, and apparatus, including computer programs encoded on computer storage media, for synonym verification. In one aspect, a method includes receiving a term and a candidate synonym for the term. The method further includes generating a term group of one or more text strings and a synonym group of one or more text strings. Each text string in the term group corresponding to a translation of the term into a language, and each text string in the synonym group corresponding to a translation of the synonym into the language. The method further includes determining whether the candidate synonym is a valid synonym for the term from an amount of overlap between the term group of text strings and the synonym group of text strings.

33 Claims, 6 Drawing Sheets

SYNONYM VERIFICATION

BACKGROUND

This specification relates to synonym verification.

Synonyms are commonly used in query expansion. For example, when a user submits a search query to a search engine, the search engine can automatically expand the query to include synonyms for the terms of the query. The search engine then identifies resources responsive to the expanded query and uses the identified resources to generate one or more search results for presentation to the user.

The synonyms used in query expansion are often generated by computers, for example, using transliteration and diacritical variant techniques. However, these computer generated synonyms are not always valid synonyms. For example, "těžká vína" might be identified as a synonym for "těžká vína", as the only difference between the two terms is the diacritical over the "i" in "těžká vína." However, the two terms have very different meanings "Tăžká vina" means "heavy guilt" in Czech, while "těžká vína" means "heavy wines" in Czech. Therefore, "těžká vína" is not a valid synonym for "těžká vína."

SUMMARY

This specification describes technologies relating to validating the accuracy of candidate synonyms for a term.

In general, one aspect of the subject matter described in this specification can be embodied in methods that include the actions of receiving a term and a candidate synonym for the term, where the term is in a first language, and the candidate synonym is in a second language; generating a term group of one or more text strings and a synonym group of one or more text strings, each text string in the term group corresponding to a translation of the term into a third language, and each text string in the synonym group corresponding to a translation of the synonym into the third language, where the third language is different from the first language and the second language; determining whether the candidate synonym is a valid synonym for the term from an amount of overlap between the term group of text strings and the synonym group of text strings. Other embodiments of this aspect include corresponding systems, apparatus, and computer programs recorded on computer storage devices, each configured to perform the operations of the methods.

These and other embodiments can each optionally include one or more of the following features. The method can further include adding an entry to a synonym table if the candidate synonym is a valid synonym for the term, the entry associating the candidate synonym with the term, and otherwise not adding the entry to the synonym table. The term can be from a search query, and the method can further include expanding the search query to include the candidate synonym if the candidate synonym is a valid synonym for the term, and otherwise not expanding the search query to include the candidate synonym. The term can be from a search query, and the method can further include expanding the search query to include the candidate synonym; and generating search results responsive to the expanded query, the generating including, if the candidate synonym is not a valid synonym for the term, modifying a rank given to search results responsive to the candidate synonym. The term can be from a search query and the method can further comprise generating a ranked group of search results responsive to the search query, the generating including ranking each search result responsive to the search query based in part on whether the search result includes the candidate synonym.

The term can be from a search query and the candidate synonym can be an invalid synonym for the term. The method can further comprise determining, from an analysis of a number of terms in the search query, whether to perform one of expanding the search query to include the candidate synonym, not expanding the search query to include the candidate synonym, or not expanding the search query to include the candidate synonym but using the candidate synonym when ranking search results responsive to the search query. The determination can be further based on an estimated number of search results responsive to the search query.

Generating the term group of text strings and the synonym group of text strings can include receiving a group of term phrases and a group of synonym phrases from a translation source, each term phrase corresponding to a translation of the term into the third language, and each synonym phrase corresponding to a translation of the candidate synonym into the third language. Generating the term group of text strings and the synonym group of text strings can further include identifying the group of term phrases as the term group of text strings, and the identifying the group of synonym phrases as the synonym group of text strings.

Generating the term group of text strings and the synonym group of text strings can further include normalizing each term phrase and each synonym phrase; and identifying the group of normalized term phrases as the term group of text strings, and identifying the group of normalized synonym phrases as the synonym group of text strings. Normalizing each term phrase and each synonym phrase can include normalizing a case of each letter in each term phrase and each letter in each synonym phrase and removing any stop words from each term phrase and each synonym phrase. Normalizing each term phrase and each synonym phrase can further include replacing each word in each term phrase and each synonym phrase with a corresponding stem for the word.

The method can further include receiving a confidence score for each term phrase and each synonym phrase, where the confidence score estimates a confidence in a quality of the translation of the term or synonym to the term phrase or synonym phrase. The term group of text strings can only include text strings derived from term phrases having a confidence score that satisfies a threshold; and the synonym group of text strings only includes text strings derived from synonym phrases having a confidence score that satisfies the threshold.

The amount of overlap can be a number of text strings that are in both the term group of text strings and the synonym group of text strings; and the candidate synonym can be a valid synonym for the term if the number of text strings is non-zero. The amount of overlap can be an overall similarity score for the term group of text strings and the synonym group of text strings, the overall similarity score derived from individual similarity scores between pairs of text strings, each pair including a text string from the term group of text strings and a pair from the synonym group of text strings. The individual similarity score for a pair of text strings can be derived from the edit distance between the text strings. The first language and the second language can be a same language.

Particular embodiments of the subject matter described in this specification can be implemented so as to realize one or more of the following advantages. Candidate synonyms for a term can be validated. Candidate synonyms for a term whose meaning differs from the meaning of the term can be identified, and not used as synonyms for the term. More accurate synonym tables can be built. More accurate query expansion, using only valid synonyms for a term, can be performed. Better search results can be returned in response to the more accurately expanded query. Close synonyms for a term can be identified.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
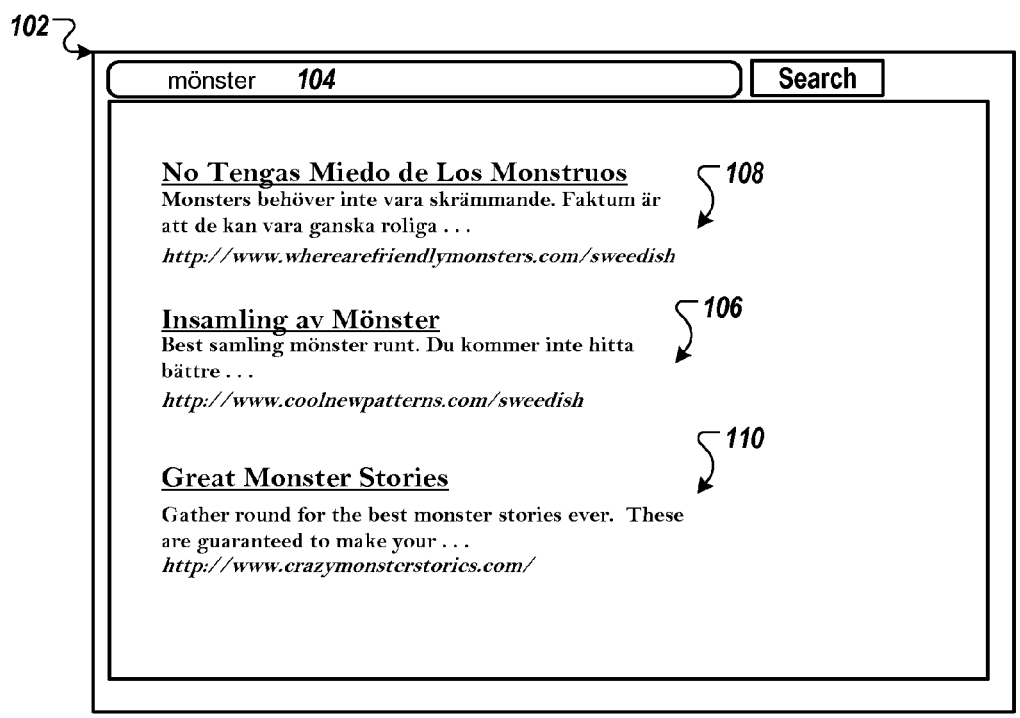
FIG. 1 illustrates an example user interface displaying search results identified in response to a user query.

FIG. 1 illustrates an example user interface 102 displaying search results identified in response to a user query 104. The query 104 is for "mönster," which means "patterns" in Swedish. The user who issued the query is likely looking for search results related to patterns, for example, search result 106, whose title "Insamling av Mönster" translates to "Collection of Patterns."

The search engine that generated the search results 106, 108, and 110 illustrated in FIG. 1 expanded the search query to include possible synonyms for the word "mönster," including "monster." "Monster" is a diacritical variant of the term "mönster" (i.e., a version of mönster where the "ö" character is replaced with the "o" character). In general, query expansion to include term synonyms is useful, because the expanded query broadens the scope of the user's search, and may identify relevant search results that otherwise would not be identified. However, while replacing the character "ö" with the character "o" may seem like a reasonable substitution, in this case, it changes the meaning of the word. In Swedish, the word "monster" has the same meaning as the English word "monster." Therefore, search results 108 and 110, while responsive to the query "monster" are likely not relevant to the user's initial search query "mönster."

A search system can improve search result quality by filtering out invalid candidate synonyms and only using valid synonyms for query expansion. Synonyms are also used in other contexts. For example, when advertisements are tied to particular terms, synonyms for those terms can be used to determine when an advertisement should be displayed. Synonyms can also be used in other search contexts, for example, to expand the terms associated with products during product searches. These other contexts can also benefit from filtering out invalid candidate synonyms and only using valid synonyms.

Figure 2:
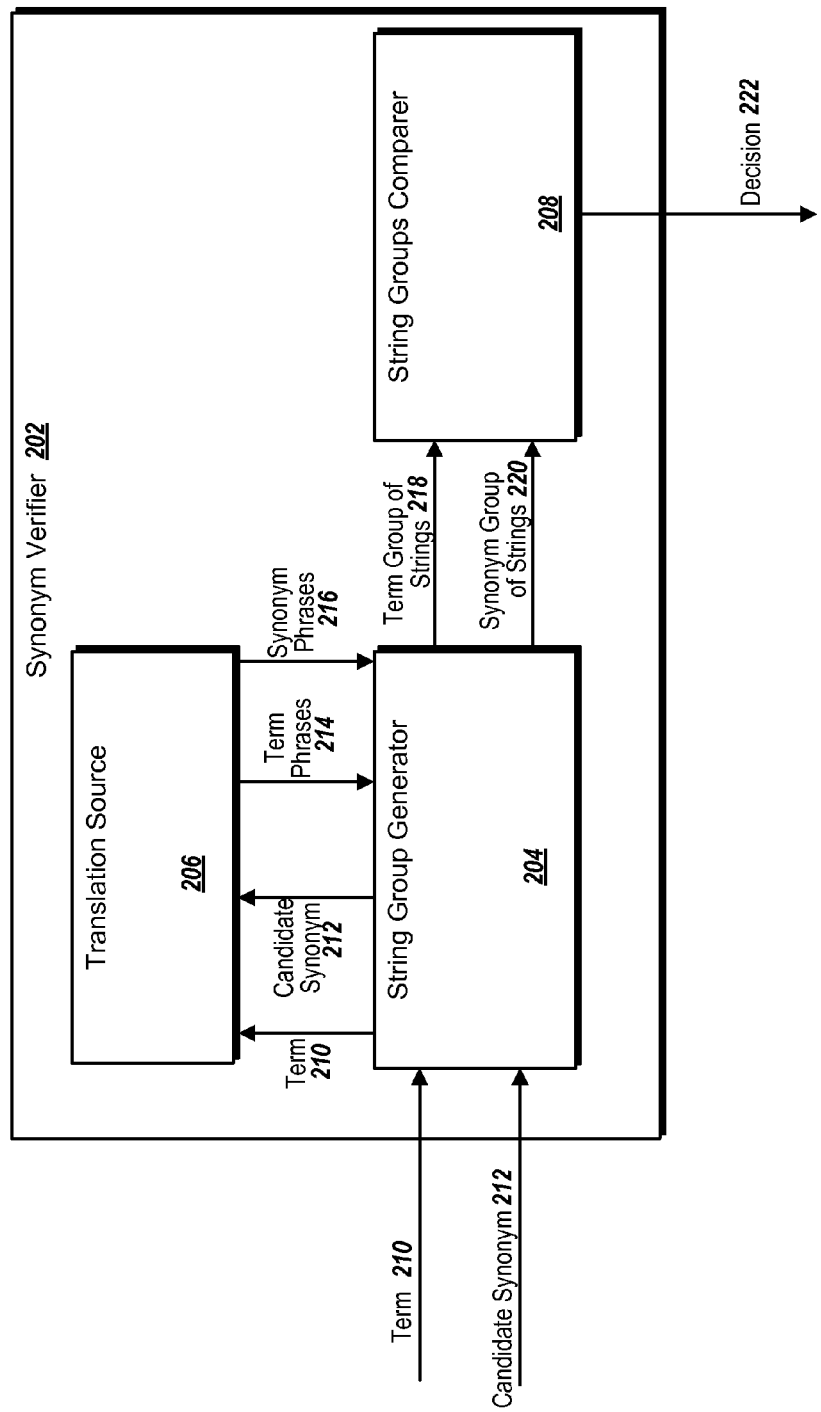
FIG. 2 illustrates an example synonym verifier.

FIG. 2 illustrates an example synonym verifier 202. The synonym verifier includes a string group generator 204, a translation source 206, and a string group comparer 208. These components can be communicatively coupled to one or more of each other. Though the components identified above are described as being separate or distinct, two or more of the components may be combined in a single process or routine. The functional description provided herein including separation of responsibility for distinct functions is by way of example. Other groupings or other divisions of functional responsibilities can be made as necessary or in accordance with design preferences.

The string group generator 204 receives a term 210 and a candidate synonym 212. The term 210 and the candidate synonym 212 are each phrases. They can be n-grams, individual words, or one or more words, for example, phrases. In general, the term 210 and the candidate synonym 212 each describe a single concept, for example, "apple," "orange," "heavy door," etc. The term 210 and the candidate synonym 212 can be in the same, or a different, natural language. For example, the term 210 can be "θέα," meaning "view" in Greek, and the candidate synonym 212 can be "θεά," meaning "goddess" in Greek. As another example, the term 210 can be "γάτα," meaning "cat" in Greek, and the candidate synonym can be "katze," meaning "cat" in German. The candidate synonym 212 for the term can be generated, for example, using traditional techniques for generating synonyms, for example, transliteration, translation, and analysis of language patterns.

The string group generator 204 sends the term 210 to a translation source 206 and receives a group of term phrases 214 from the translation source 206. The string group generator 204 also sends the candidate synonym 212 to the translation source 206 and receives a group of synonym phrases 216. The string group generator 204 processes the term phrases 214 and the synonym phrases 216 to generate a term group of text strings 218 and a synonym group of text strings 220.

The translation source 206 can be any source capable of translating words from the language of the term and the language of the candidate synonym to a standard language that is different from the language of the term and the language of the candidate synonym. For example, the translation source 206 can translate the term θέα and the candidate synonym θεά, from Greek to the standard language English. Similarly, the translation source 206 can translate the term "γάτα" to the standard language English, and the candidate synonym "katze" to the standard language English.

Any standard language can be used. For example, in some implementations, the standard language is English. English can be a useful standard language because it is includes a large number of words, and therefore, different concepts are generally expressed using different written words. In some implementations, the translation source 206 is a machine translation system. In other implementations, the translation source 206 is a dictionary that includes phrases (e.g., terms and candidate synonyms) in one or more languages and translations of the phrases into the standard language.

The output of the translation source 206 is one or more phrases corresponding to the term 210 or candidate synonym 212, and optionally, a confidence score for each phrase. The confidence score estimates how accurate the translation is. For example, the translation source 206 could translate the term "mönster" in Swedish into the group of English phrases: {patterns, Patterns, the patterns, design, ornamented}. In addition, the translation source 206 could provide a confidence score for each phrase, for example, {patterns: 0.99, Patterns: 0.99, the patterns: 0.90, design: 0.52, ornamented: 0.20}. As another example, the translation source 206 could translate the term "monster" in Swedish into the group of English phrases: {monster, Monster, the monster, ogre, devil, fiend}, and similarly associate each phrase with a confidence score. In some implementations, especially where the translation source 206 is a machine translation system, some of the phrases are not accurate translations of the term 210 or candidate synonym 212. In these cases, the phrases will generally have a low confidence score.

When the string group generator 204 receives the term phrases 214 and the synonym phrases 216, the string group generator 204 processes the term phrases 214 and the synonym phrases 216 to generate a term group of text strings 218 and a synonym group of text strings 220. In general, each text string in the term group of text strings 218 is a sequence of characters corresponding to one of the term phrases 214. Similarly, each text string in the synonym group of text strings 220 is a sequence of characters corresponding to one of the synonym phrases 216. Various techniques for generating the term group of text strings 218 and the synonym group of text strings 220 are described below.

In some implementations, the string group generator 204 generates the term group of text strings 218 and the synonym group of text strings 220 by outputting the group of term phrases 214 as the term group of text strings 218 and outputting the group of synonym phrases 216 as the synonym group of text strings 220. For example, if the group of term phrases 214 is {patterns, Patterns, the patterns, design, ornamented}, the term group of text phrases 218 can be {patterns, Patterns, the patterns, design, ornamented}.

In some implementations, the string group generator 204 normalizes the term phrases 214 and the synonym phrases 216. The normalized term phrases include a normalized version of each term phrase 214 in the term group of text strings 218. The normalized synonym phrases include a normalized version of each synonym phrase 216 in the synonym group of text strings 220. For example, if the group of term phrases 214 is {patterns, Patterns, the patterns, design, ornamented}, the term group of text phrases 218 can be {pattern, pattern, pattern, design, ornament}. The normalized synonym phrases can further be filtered to remove duplicate phrases, for example, if the group of term phrases 214 is {patterns, Patterns, the patterns, design, ornamented}, the term group of text phrases 218 can be {pattern, design, ornament}.

The string group generator 204 can perform one or more of various normalizations, including, but not limited to, standardizing the capitalization of characters in the phrases, removing stop words from the phrases, stemming the words in the phrases, and compounding or decompounding words in the phrases.

Standardizing the capitalization of characters in the phrases includes, for example, making the characters all lowercase, making the characters all uppercase, or making only the first word in the phrase start with a capital letter. Stop words are known terms that do not contribute to the topicality of a phrase, for example "a" or "the." Stemming a word is converting the word to its stem, or base, form. For example, if the word is "running," then its stemmed form is "run." Compounding words in a phrase is combining two or more words in the phrase into a single word. For example, the words in the phrase "news paper" can be compounded into the word "newspaper." Decompounding words in a phrase is splitting a compound word in the phrase into its two corresponding words. For example, the word "newspaper" can be decompounded into the phrase "news paper."

In some implementations, the string group generator 204 further filters the group of term phrases 214 and the group of synonym phrases 216 so that only phrases, or their normalized forms, having a confidence score above a certain threshold are included in the term group of text strings 218 and the synonym group of text strings 220. The threshold can be determined, for example, empirically. For example, if the group of term phrases 214, with confidence scores, is {patterns: 0.99, Patterns: 0.99, the patterns: 0.90, design: 0.52, ornamented: 0.20} and the threshold is 0.60, the term group of strings 218 can be {patterns, Patterns, the patterns}. Alternatively, if the string group normalizes the text phrases, the term group of text strings 218 can be {pattern, pattern, pattern}, or {pattern} if duplicates are removed.

The string group comparer 208 receives the term group of strings 218 and the synonym group of strings 220, compares them, and outputs a decision 222. The decision 222 indicates whether the candidate synonym 212 is a valid synonym for the term 210. In general, the decision 222 is based on an amount of overlap between the term group of strings 218 and the synonym group of strings 220. Various techniques, and combinations of techniques, for comparing the two groups of strings can be used. Some example techniques are described below.

In some implementations, the string group comparer 208 determines the intersection between the term group of strings 218 and the synonym group of strings 220. The intersection between the two groups of strings is a group of strings that appears in both the term group of strings 218 and the synonym group of strings 220. For example, if the term group of strings 218 is {fiend, devil, ogre} and the synonym group of strings 220 is {genius, strategic, fiend}, the intersection of the two groups of strings is {fiend}. The string group comparer 208 determines whether there is sufficient amount of overlap between the two groups by determining whether the number of strings in the intersection exceeds a threshold number, e.g., zero. If so, the string groups comparer 208 makes the decision 210 that the candidate synonym 212 is a valid synonym for the term 210. Otherwise, the string comparer 208 makes the decision 210 that the candidate synonym 212 is not a valid synonym for the term 210. The threshold can be determined, for example, empirically.

In some implementations, the string groups comparer 208 compares pairs of strings including a string from the term group of strings 218 and a string from the synonym group of strings 220. The string groups comparer 208 generates an individual similarity score for each pair of strings, and then combines the individual scores to generate an overall similarity score for the two groups of strings. The individual similarity score can be, for example, the edit distance of the strings. The overall similarity score can be, for example, the sum of the individual scores or an average of the individual scores. The string groups comparer 208 then compares the overall score to a threshold score. If the overall score satisfies, e.g., exceeds, the threshold score, then the string groups comparer 208 makes the decision 210 that the candidate synonym 212 is a valid synonym for the term 210. Otherwise, the string comparer 208 makes the decision 210 that the candidate synonym 212 is not a valid synonym for the term 210. The threshold can be determined, for example, empirically.

In some implementations, the string groups comparer 208 uses a combination of the above techniques. For example, the string groups comparer 208 can verify that the intersection between the two groups has at least one element in it and that the overall similarity score for the two groups satisfies a threshold. In some implementations, the string groups comparer 208 uses a lower threshold for one comparison technique, when the other comparison technique indicates that there is sufficient overlap.

In some implementations, the string groups comparer 208 only identifies candidate synonyms that are close synonyms to the term as valid synonyms. A close synonym is a synonym that has an identical, or nearly identical, meaning as the meaning of the term. For example, "pattern" and "Pattern" are close synonyms, as they have identical meanings. The string groups comparer 208 can determine that the synonym is a close synonym, for example, by using a threshold that is more strict than the threshold normally used to identify valid synonyms.

Figure 3:
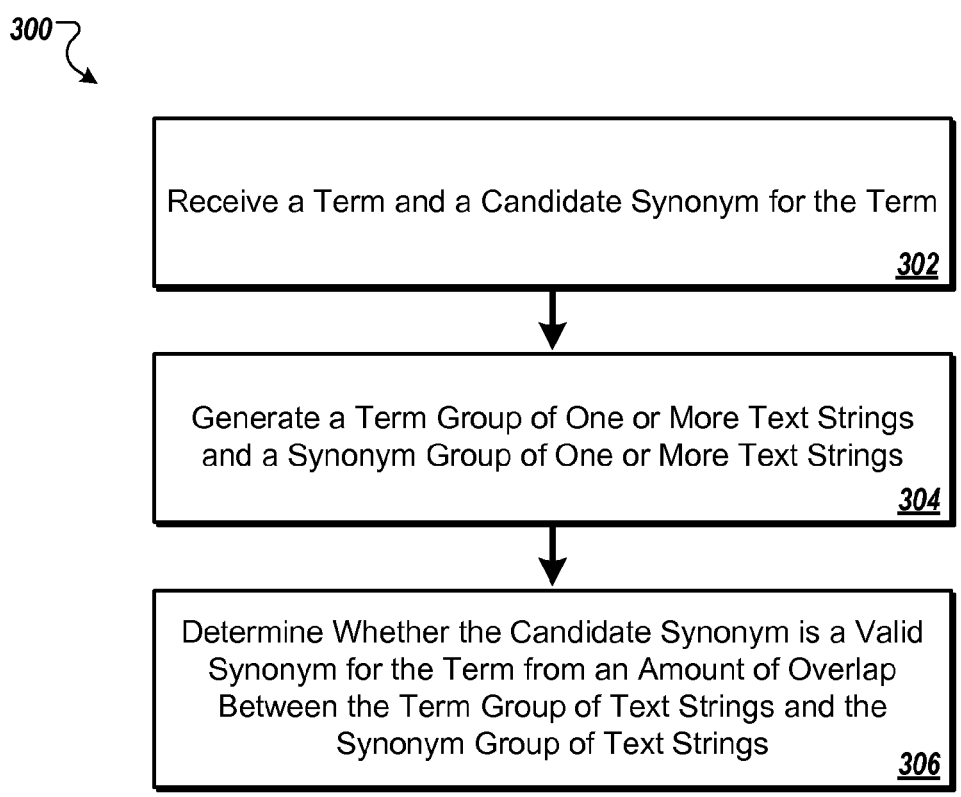
FIG. 3 illustrates an example method for determining whether a candidate synonym is a valid synonym.

FIG. 3 illustrates an example method 300 for determining whether a candidate synonym is a valid synonym. For convenience, the example method 300 will be described in reference to a system that performs the method 300. The system can be, for example, the synonym verifier 202.

The system receives 302 a term and a candidate synonym for the term, for example, as described above with reference to FIG. 2. The term and the candidate synonym can be in the same, or in different, languages.

The system generates 304 a term group of one or more text strings and a synonym group of one or more text strings. Each text string in the term group of text strings corresponds to a translation of the term into a given language, and each text string in the synonym group corresponds to a translation of the term into the given language. The system can generate the term group of text strings and the synonym group of text strings, for example, as described above with reference to FIG. 2.

The system determines 306 whether the candidate synonym is a valid synonym for the term. The system makes this determination from an amount of overlap between the term group of text strings and the synonym group of text strings, for example, as described above with reference to FIG. 2.

Once the system 306 determines whether the candidate synonym is a valid synonym, the determination can be used in various ways. For example, the determination can be used during query expansion, as described below with reference to FIGS. 4-6. The determination can also be used to filter out invalid synonyms while building a synonym table, as described below with reference to FIG. 6.

Figure 4:
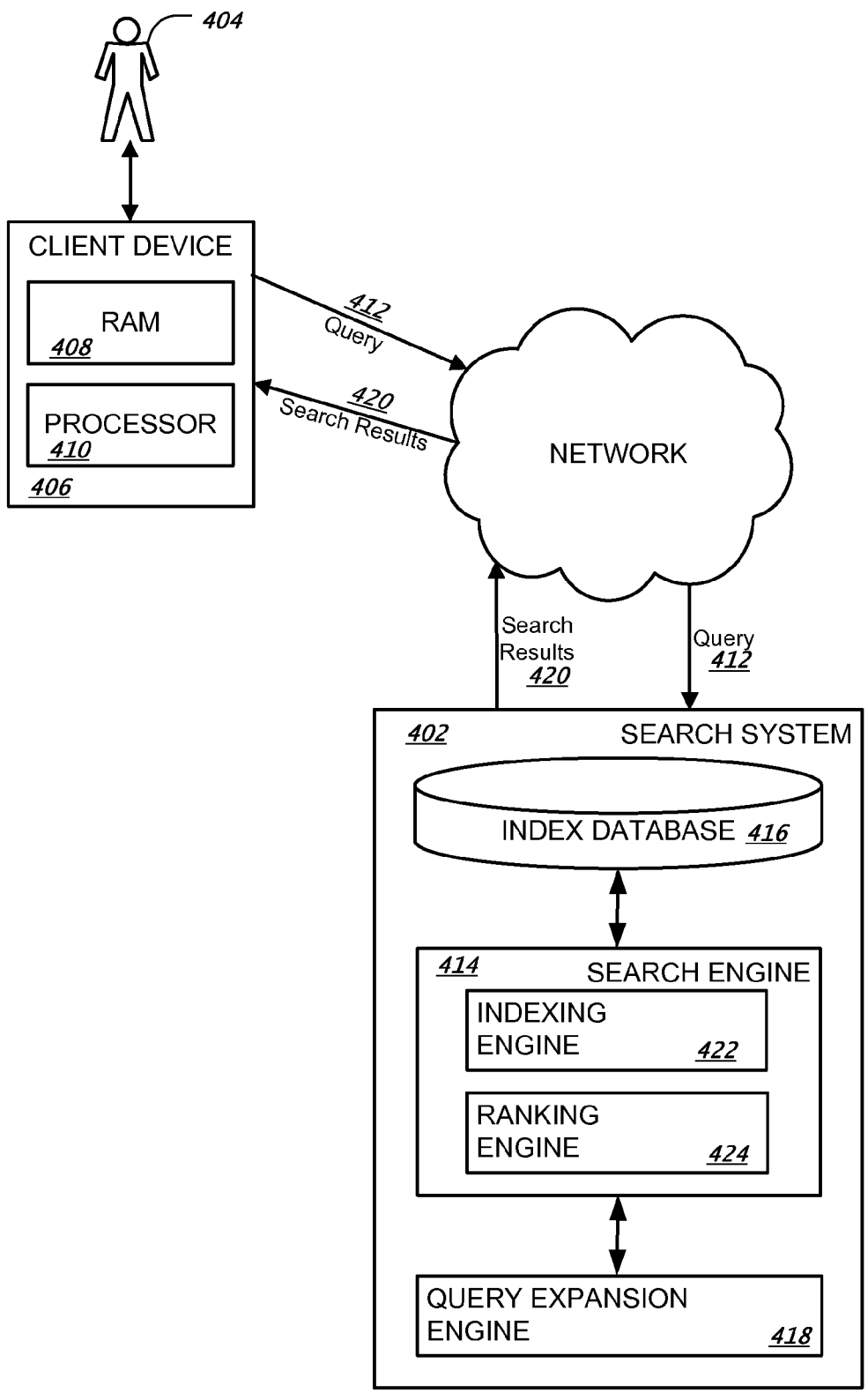
FIG. 4 illustrates an example search system.

FIG. 4 illustrates an example search system 402 for providing search results relevant to submitted queries as can be implemented in an internet, an intranet, or another client and server environment. The search system 402 is an example of an information retrieval system. The search system 402 can use a synonym verifier, such as the synonym verifier 202 described above with reference to FIG. 2 to aid in query expansion.

A user 404 interacts with the search system 402 through a client device 406. For example, the client device 406 can be a computer (e.g., a personal computer, a mobile phone, etc.) coupled to the search system 402 through a wired or wireless local area network (LAN) or wide area network (WAN), e.g., the Internet. In some implementations, the search system 402 and the client device 406 are one machine. For example, a user can install a desktop search application on the client device 406. The client device 406 will generally include a random access memory (RAM) 408 and a processor 410.

A user 404 submits a query 412 to a search engine 414 within the search system 402. When the user 404 submits the query 412, the query 412 is transmitted through a network to the search system 402. The search system 402 can be implemented as, for example, computer programs running on one or more computers in one or more locations that are coupled to each other through a network. The search system 402 includes an index database 416, the search engine 414, and a query expansion engine 418. The search system 402 responds to the query 412 by generating search results 420, which are transmitted through the network to the client device 406 in a form that can be presented to the user 404, e.g., as a search results web page to be displayed in a web browser running on the client device 406.

When the query 412 is received by the search system 402, the query expansion engine 418 generates an expanded from of the query 412 by adding one or more synonyms for one or more terms of the query to the query. The search engine 414 identifies documents that match the query 412, or an expanded form of the query 412 generated by the query expansion engine 418. The search engine 414 will generally include an indexing engine 422 that indexes web documents (e.g., web pages, images, multimedia content, or news articles on the Internet) found in a corpus (e.g., a collection or repository of content) and a ranking engine 424 (or other software) to rank the documents that match the query 412, or the expanded form of the query 412. The indexing and ranking of the documents can be performed, for example, using conventional techniques.

Figure 5:
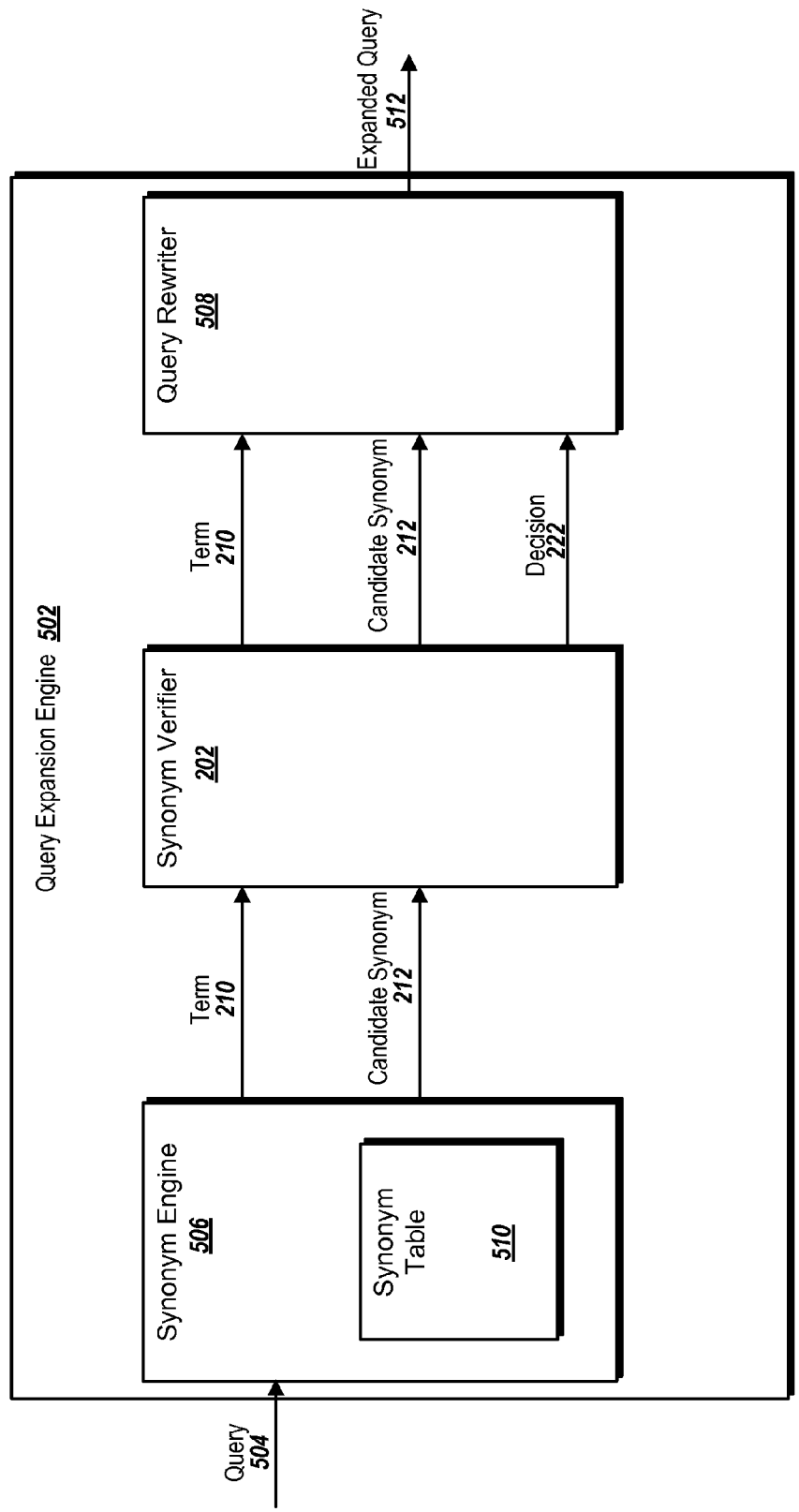
FIG. 5 illustrates an example query expansion engine.

FIG. 5 illustrates an example query expansion engine 502. The query expansion engine 502 is an example of the query expansion engine 418 described above with reference to FIG. 4. The query expansion engine 502 expands a user search query 504 to include valid synonyms for terms in the query. The query expansion engine 502 includes a synonym engine 506, the synonym verifier 202 (as shown in FIG. 2), and a query rewriter 508.

The synonym engine 506 receives the query 504. The synonym engine 506 parses the query 504 into one or more terms, and identifies a candidate synonym 212 for one of the terms 210. For example, if the query includes the term "egér," meaning "mouse" in Hungarian, the synonym engine 506 can extract the term "egér" from the query. The synonym engine can then identify the candidate synonym "éger," meaning "alder tree" in Hungarian.

The synonym engine 506 can identify the candidate synonym 212, for example, by looking the term 210 up in a synonym table 510. The synonym table 510 can include, for example, transliterations, diacritical variants, translations, and other synonyms of terms. Some of the synonyms in the synonym table 510 may not be good synonyms for the term 210. For example, if the term is "mönster," the synonym table 510 might include the transliteration "monster," as a candidate synonym for the term, even though "monster" does not have the same meaning as "mönster." The synonym table 510 can have various structures. For example the synonym table 510 can store entries associating candidate synonyms with individual terms. An example entry in this type of synonym table is "egér: éger." As another example, the synonym table 510 can store entries associating candidate synonyms with normalized forms of individualized terms, for example, the root form of terms, or a version of terms where all diacriticals have been removed. An example entry in this type of table is "eger: egér, éger."

To identify valid and invalid candidate synonyms, the synonym engine 506 sends the term 210 and the selected candidate synonym 212 to a synonym verifier 202. The synonym verifier 202 determines whether the candidate synonym 212 is a valid synonym for the term 210, and outputs its decision 222 to a query rewriter 508. The query rewriter 508 then generates an expanded query 512 corresponding to the original query 504.

In some implementations, the query rewriter 508 only includes the candidate synonym 212 in the expanded query 512 when the decision 222 is that the candidate synonym 212 is a valid synonym for the term 210. For example, the query rewriter 508 might expand the query "black cat facts" to "black (cat or càt) facts" because "càt" is a valid synonym for cat. However, the query rewriter 508 would not expand the query "egér" to include "éger," because "éger" is not a valid synonym for "egér." Thus, a search engine will perform a search using the expanded query 512 including only valid candidate synonyms.

In other implementations, the query rewriter always includes the candidate synonym 212. However, when the expanded query 512 is provided to a search engine, the query rewriter specifies that a modified, e.g., discounted, rank should be given to search results responsive to the candidate synonym 212. The search engine that performs a search for the expanded query 512 will discount a score assigned to search results responsive to the candidate synonym 212, so that those search results will have a discounted rank. For example, the results engine 424 described above with reference to FIG. 4 can perform this rank adjustment. The amount the rank is discounted can be, for example, a predetermined value or a value calculated from the amount of overlap between the term group of text strings and the synonym group of text strings.

In some other implementations, the query rewriter does not include the candidate synonym 212 in the expanded query, but indicates that the candidate synonym should be used to rank documents responsive to the query. In these implementations, the query rewriter indicates to the search engine that the search engine should not identify results as being responsive to the candidate synonym 212, but should instead consider whether the results include the candidate synonym 212 during ranking, for example, by assigning a higher score to search results that include the candidate synonym 212. The search engine can then consider the candidate synonym 212 as being part of the query for ranking purposes only.

In other implementations, the query rewriter 508 analyzes the query 504 to decide whether to ignore invalid candidate synonyms, whether to include invalid synonyms in the expanded query with a discounted rank for their responsive search results, or whether to use the invalid candidate synonyms for ranking purposes only. The query rewriter 508 can make this decision, for example, by analyzing the length of the query and/or an estimated number of search results responsive to the query. The estimated number of search results responsive to the query can be determined, for example, using a linear combination of the inverse document frequency of the terms in the query. For example, longer queries are less influenced by the addition of additional terms, while shorter queries can be more dramatically changed by the addition of additional terms. Therefore, the query rewriter 508 should not include invalid synonyms in shorter queries. Including the invalid synonyms will increase the number of results responsive to the expanded query, and therefore, if the estimated number of search results is less than a threshold, the query rewriter 508 should include invalid synonyms for queries with few estimated results. The query rewriter can compare the length of the query and/or the estimated number of search results to thresholds associated with the three courses of action. The thresholds can be determined from an empirical evaluation of the effect various thresholds have on performance.

Figure 6:
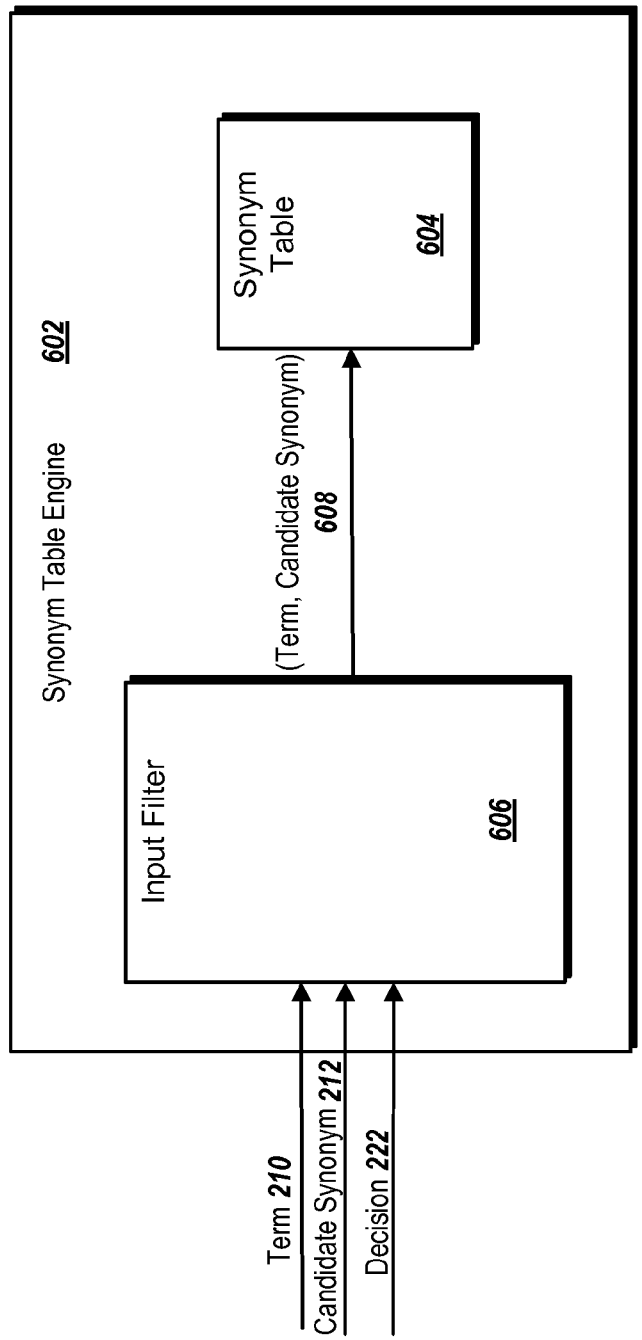
FIG. 6 illustrates an example synonym table engine.

FIG. 6 illustrates an example synonym table engine 602. The synonym table engine 602 builds a synonym table 604 that includes synonyms for various terms. Unlike the synonym table 510 described above with reference to FIG. 5, the synonym table 604 only includes valid synonyms for terms. A query expansion engine 418 can use the synonym table 604 during query expansion, without doing further filtering.

The example synonym table engine 602 includes an input engine 606 and a synonym table 604. The synonym table 604 is a database that stores entries associating terms and valid synonyms for the terms. The synonym table 604 receives the entries it stores from the input filter 606.

The input filter 606 receives a term 210, a candidate synonym 212 for the term, and a decision 222. The term 210 and candidate synonym 212 can be generated, for example, from a synonym generating program. The decision can generated, for example, by the synonym verifier 202 described above with reference to FIG. 2. If the decision 222 is that the candidate synonym 212 is a valid synonym for the term 210, the input filter 606 inserts a (term, candidate synonym) entry 608 into the synonym table 604. Otherwise, the input filter filters out the term 210 and candidate synonym 212 and does not insert an entry into the synonym table 604.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
   receiving a term and a candidate synonym for the term at a generator, where the term is in a first language, and the candidate synonym is in a second language, and where the second language is different than the first language;
   generating a term group of one or more text strings and a synonym group of one or more text strings at the generator, each text string in the term group corresponding to a translation of the term into a third language, and each text string in the synonym group corresponding to a translation of the synonym into the third language, where the third language is different from the first language and the second language; and
   determining, from an amount of overlap between the term group of text strings and the synonym group of text strings, whether the candidate synonym is a valid synonym for the term at a verifier.

2. The method of claim 1, further comprising:
   adding an entry to a synonym table if the candidate synonym is a valid synonym for the term, the entry associating the candidate synonym with the term; and if the candidate synonym is an invalid synonym for the term, preventing the entry from being added to the synonym table.

3. The method of claim 1, where:
   the term is from a search query; and the method further comprises
expanding the search query to include the candidate synonym if the candidate synonym is a valid synonym for the term, and
if the candidate synonym is an invalid synonym for the term, preventing the search query from being expanded to include the candidate synonym.

4. The method of claim 1, where the term is from a search query, the method further comprising:
expanding the search query to include the candidate synonym; and
generating search results responsive to the expanded search query, the generating including, if the candidate synonym is not a valid synonym for the term, modifying a rank given to search results responsive to the candidate synonym.

5. The method of claim 1, where the term is from a search query, the method further comprising generating a ranked group of search results responsive to the search query, the generating including ranking each search result responsive to the search query based in part on whether the search result includes the candidate synonym.

6. The method of claim 1, where the term is from a search query and the candidate synonym is not a valid synonym for the term, the method further comprising:
determining, from an analysis of a number of terms in the search query, whether to perform one of expanding the search query to include the candidate synonym; or
ranking search results responsive to the search query using the candidate synonym instead of expanding the search query to include the candidate synonym.

7. The method of claim 6, where the determination is further based on an estimated number of search results responsive to the search query.

8. The method of claim 1, where generating the term group of text strings and the synonym group of text strings includes receiving a group of term phrases and a group of synonym phrases from a translation source, each term phrase corresponding to a translation of the term into the third language, and each synonym phrase corresponding to a translation of the candidate synonym into the third language.

9. The method of claim 8, where generating the term group of text strings and the synonym group of text strings further includes:
identifying the group of term phrases as the term group of text strings; and
identifying the group of synonym phrases as the synonym group of text strings.

10. The method of claim 8, where generating the term group of text strings and the synonym group of text strings further includes:
normalizing each term phrase and each synonym phrase;
identifying a group of normalized term phrases as the term group of text strings; and
identifying a group of normalized synonym phrases as the synonym group of text strings.

11. The method of claim 10, where normalizing each term phrase and each synonym phrase includes normalizing a case of each letter in each term phrase and each letter in each synonym phrase and removing any stop words from each term phrase and each synonym phrase.

12. The method of claim 11, where normalizing each term phrase and each synonym phrase further includes replacing each word in each term phrase and each synonym phrase with a corresponding stem for the word.

13. The method of claim 8, further comprising receiving a confidence score for each term phrase and each synonym phrase, where the confidence score estimates a confidence in a quality of the translation of the term or synonym to the term phrase or synonym phrase; where:
the term group of text strings only includes text strings derived from term phrases having a confidence score that satisfies a threshold; and
the synonym group of text strings only includes text strings derived from synonym phrases having a confidence score that satisfies the threshold.

14. The method of claim 1, where:
the amount of overlap is a number of text strings that are in both the term group of text strings and the synonym group of text strings; and
the candidate synonym is a valid synonym for the term if the number of text strings is non-zero.

15. The method of claim 1, where:
the amount of overlap is an overall similarity score for the term group of text strings and the synonym group of text strings;
the overall similarity score is derived from individual similarity scores between pairs of text strings; and
each of the pairs of text strings includes a text string from the term group of text strings and a text string from the synonym group of text strings.

16. The method of claim 15, where the individual similarity score for a pair of text strings is derived from an edit distance between the text strings.

17. A system comprising:
one or more computers programmed to perform operations comprising:
receiving a term and a candidate synonym for the term, where the term is in a first language, and the candidate synonym is in a second language, and where the second language is different than the first language;
generating a term group of one or more text strings and a synonym group of one or more text strings, each text string in the term group corresponding to a translation of the term into a third language, and each text string in the synonym group corresponding to a translation of the synonym into the third language, where the third language is different from the first language and the second language; and
determining, from an amount of overlap between the term group of text strings and the synonym group of text strings, whether the candidate synonym is a valid synonym for the term.

18. The system of claim 17, further programmed to perform operations comprising:
adding an entry to a synonym table if the candidate synonym is a valid synonym for the term, the entry associating the candidate synonym with the term; and
if the candidate synonym is an invalid synonym for the term, preventing the entry from being added to the synonym table.

19. The system of claim 17, where:
the term is from a search query; and
the system is further programmed to perform operations comprising:
expanding the search query to include the candidate synonym if the candidate synonym is a valid synonym for the term, and
if the candidate synonym is an invalid synonym for the term, preventing the search query from being expanded to include the candidate synonym.

20. The system of claim 17, where the term is from a search query, the system further programmed to perform operations comprising:

expanding the search query to include the candidate synonym; and generating search results responsive to the expanded search query, the generating including, if the candidate synonym is not a valid synonym for the term, modifying a rank given to search results responsive to the candidate synonym.

21. The system of claim 17, where the term is from a search query, the system further programmed to perform operations comprising generating a ranked group of search results responsive to the search query, the generating including ranking each search result responsive to the search query based in part on whether the search result includes the candidate synonym.

22. The system of claim 17, where the term is from a search query and the candidate synonym is not a valid synonym for the term, the system further programmed to perform operations comprising:

determining, from an analysis of a number of terms in the search query, whether to perform one of expanding the search query to include the candidate synonym or ranking search results responsive to the search query using the candidate synonym instead of expanding the search query to include the candidate synonym.

23. The system of claim 22, where the determination is further based on an estimated number of search results responsive to the search query.

24. The system of claim 17, where generating the term group of text strings and the synonym group of text strings includes receiving a group of term phrases and a group of synonym phrases from a translation source, each term phrase corresponding to a translation of the term into the third language, and each synonym phrase corresponding to a translation of the candidate synonym into the third language.

25. The system of claim 24, where generating the term group of text strings and the synonym group of text strings further includes:

identifying the group of term phrases as the term group of text strings; and identifying the group of synonym phrases as the synonym group of text strings.

26. The system of claim 24, where generating the term group of text strings and the synonym group of text strings further includes:

normalizing each term phrase and each synonym phrase;

identifying a group of normalized term phrases as the term group of text strings; and identifying a group of normalized synonym phrases as the synonym group of text strings.

27. The system of claim 26, where normalizing each term phrase and each synonym phrase includes normalizing a case of each letter in each term phrase and each letter in each synonym phrase and removing any stop words from each term phrase and each synonym phrase.

28. The system of claim 27, where normalizing each term phrase and each synonym phrase further includes replacing each word in each term phrase and each synonym phrase with a corresponding stem for the word.

29. The system of claim 24, further programmed to perform operations comprising receiving a confidence score for each term phrase and each synonym phrase, where:

the confidence score estimates a confidence in a quality of the translation of the term or synonym to the term phrase or synonym phrase;

the term group of text strings only includes text strings derived from term phrases having a confidence score that satisfies a threshold; and the synonym group of text strings only includes text strings derived from synonym phrases having a confidence score that satisfies the threshold.

30. The system of claim 17, where:

the amount of overlap is a number of text strings that are in both the term group of text strings and the synonym group of text strings; and the candidate synonym is a valid synonym for the term if the number of text strings is non-zero.

31. The system of claim 17, where:

the amount of overlap is an overall similarity score for the term group of text strings and the synonym group of text strings;

the overall similarity score is derived from individual similarity scores between pairs of text strings; and each of the pairs of text strings includes a text string from the term group of text strings and a text string from the synonym group of text strings.

32. The system of claim 31, where the individual similarity score for a pair of text strings is derived from an edit distance between the text strings.

33. A non-transitory computer storage medium encoded with a computer program, the computer program comprising instructions that when executed by a data processing apparatus cause the data processing apparatus to perform operations comprising:

receiving a term and a candidate synonym for the term, where the term is in a first language, and the candidate synonym is in a second language, and where the second language is different than the first language;

generating a term group of one or more text strings and a synonym group of one or more text strings, each text string in the term group corresponding to a translation of the term into a third language, and each text string in the synonym group corresponding to a translation of the synonym into the third language, where the third language is different from the first language and the second language; and determining, from an amount of overlap between the term group of text strings and the synonym group of text strings, whether the candidate synonym is a valid synonym for the term.

* * * * *